United States Patent [19]
Huang et al.

[11] Patent Number: 6,037,008
[45] Date of Patent: Mar. 14, 2000

[54] USE OF EMULSIFIED SILANE COUPLING AGENTS AS PRIMERS TO IMPROVE ADHESION OF SEALANTS, ADHESIVES AND COATINGS

[75] Inventors: Misty Weiyu Huang, New City; Bruce A. Waldman, Cortlandt Manor, both of N.Y.

[73] Assignee: CK Witco Corporation

[21] Appl. No.: 09/149,337

[22] Filed: Sep. 8, 1998

[51] Int. Cl.[7] ................................. B05D 1/36; B05D 1/38
[52] U.S. Cl. ....................... 427/387; 427/407.2; 427/408; 427/409; 427/410; 427/412.1
[58] Field of Search ................. 427/387, 407.2, 427/409, 408, 410, 412.1

[56] References Cited

U.S. PATENT DOCUMENTS

| | | | |
|---|---|---|---|
| 4,062,451 | 12/1977 | Gander | 206/524.2 |
| 4,309,326 | 1/1982 | Sage et al. | 260/29.6 |
| 4,394,418 | 7/1983 | Temple | 428/391 |
| 4,778,624 | 10/1988 | Ohashi et al. | 252/312 |
| 4,808,483 | 2/1989 | Nakasuji et al. | 428/447 |
| 4,990,549 | 2/1991 | Devlin et al. | 523/209 |
| 5,091,468 | 2/1992 | Takeuchi | 524/761 |
| 5,196,054 | 3/1993 | Schmuck et al. | 106/2 |
| 5,363,994 | 11/1994 | Angeline | 222/529 |
| 5,393,330 | 2/1995 | Chen et al. | 106/2 |
| 5,621,038 | 4/1997 | Chen et al. | 524/547 |
| 5,686,523 | 11/1997 | Chen et al. | 524/547 |
| 5,714,532 | 2/1998 | Osterholtz et al. | 524/114 |

FOREIGN PATENT DOCUMENTS

| | | |
|---|---|---|
| 554101 | 8/1993 | European Pat. Off. |
| 97/12940 | 4/1997 | WIPO |

*Primary Examiner*—Erma Cameron
*Attorney, Agent, or Firm*—Edward K. Welch, II; Andrew S. Reiskind

[57] ABSTRACT

Emulsions comprising a water insoluble or semi-soluble silane or mixtures of such silanes have been found useful when used alone or formulated into aqueous primer systems to improve the adhesion of sealants, adhesives or coatings to a variety of substrates. These aqueous primers are suitable for both inorganic and organic substrates having either porous or non-porous surfaces. In many cases they have been found to outperform solvent based primers. Primers of this type can be used with a variety of waterborne or solvent based sealants, adhesives or coatings including acrylic or polyurethane latexes, high solid polyurethanes, epoxies and silicones. When used with waterborne systems, it is not necessary to wait for the primer to dry before application of the sealant, adhesive or coating.

23 Claims, No Drawings

USE OF EMULSIFIED SILANE COUPLING AGENTS AS PRIMERS TO IMPROVE ADHESION OF SEALANTS, ADHESIVES AND COATINGS

BACKGROUND OF THE INVENTION

Conventional primer systems for use with sealants, adhesives and coatings generally comprise a large amount of organic solvent plus smaller amounts silane coupling agents and film formers. The solvent based primers provide good adhesion across the substrate-sealant interface and are convenient to use because they dry quickly. Organic solvents are the preferred carriers for such primers since silanes are generally not stable in waterbased systems. However, with the increased environmental concern over the emission of volatile organic compounds (VOC) it is appropriate to eliminate or lower such emissions whenever possible.

U.S. Pat. No. 4,309,326 discloses an aqueous polyester size emulsion for glass fiber comprising an unsaturated water-emulsifiable, silylated polyester resin, an EVA copolymer, and a copolymer of vinyl acetate and a prehydrolyzed, water soluble organosilane.

U.S. Pat. No. 4,394,418 discloses an aqueous sizing composition of a silylated polyvinyl acetate latex containing a low level of silane copolymerized with the vinyl acetate, a water soluble silane, non-ionic surfactants, a polyethylene-containing polymer, a glass fiber lubricant, a hydrocarbon acid and water. The monomeric silanes used in this patent are epoxysilanes and aminosilanes and can be mixed with acrylate containing water soluble silanes. The shelf life of these compositions, however, is generally less than 72 hours.

U.S. Pat. No. 5,393,330 describes emulsions of unsubstituted or halogenated alkyltrialkoxysilanes used as waterproofing agents.

U.S. Pat. No. 4,778,624 discloses a method for the preparation of a stable aqueous emulsion of a poly (silsesquioxane) from substituted and unsubstituted alkylsilanes.

Silane technology for aqueous primers has been developed in the last few years. Most of these developments are based on aminosilanes which uniquely are water soluble, forming water stable hydrolysates. Among these methods, U.S. Pat. No. 5,363,994 teaches the use of aminosilane up to 0.5 parts in combination with a hydrophobic silane in water as a primer. To inhibit condensation of the non-amino silane coupling agents the aqueous primer are required to have a pH from about 2.0 to about 5.5.

WO 9715700 describes a pre-hydrolyzed aminosilane in a concentrated phosphoric acid aqueous solution for use as a primer or conversion treatment on a metallic substrate. However, due to the inherent instability of silane in water, these aqueous primers have shelf lives less than 6 months.

U.S. Pat. No. 5,393,330 describes the use of silane emulsions for hydrophobizing concrete surfaces.

U.S. Pat. Nos. 5,686,523 and 5,714,532, incorporated herein by reference, describe a series of alkoxysilanes which can be formulated into stable emulsion for waterborne coating or sealant formulations as crosslinkers or adhesion promoters. In this technology the silanes are used as additives to a resin system or are incorporated into the resin during resin synthesis.

U.S. Pat. No. 4,689,085 describes the use of bis silyl alkanes in primer formulations but not in emulsions.

SUMMARY OF THE INVENTION

According to the present invention emulsions of water insoluble or semi-soluble silanes, described in detail below, may be employed as aqueous primers for promoting adhesion of polymeric sealant, adhesive and coating systems to a wide variety of substrates including glass, metal, concrete and plastics. These primers, when applied first to a substrate, will improve the adhesion of a variety of resin chemistries including acrylic or polyurethane dispersions, high solids polyurethanes, epoxies and RTV silicones. The resin systems being applied to the primer may or may not contain silane adhesive promoters.

These aqueous silane based primers have superior shelf stability when compared to other aqueous silane primers systems, they have good wetting properties and can be applied and cured at either room temperature or elevated temperatures. If a waterborne system is being applied over these primers it is not necessary to wait until the primer is dried before application.

The invention offers the distinct advantage of removing organic solvents (VOC's) from primer formulations while offering improved adhesion and excellent shelf stability.

Two-part primer/resin sealant, adhesive and coating systems employing the primer compositions as described herein constitute a further aspect of the invention.

DETAILED DESCRIPTION OF THE INVENTION

The adhesion promoting silanes used in the primer compositions are water insoluble or slightly soluble organosilanes with general structure of $$R^1{}_a R^2{}_b Si(OR^3)_{4-a-b}$$

where $R^1$ is a hydrocarbon group having from three to thirty carbon atoms and substituted with an organic functional group, or is a two to thirty carbon alkenyl group;

$R^2$ is alkyl, alkoxy-substituted alkyl, aryl or aralkyl, and has from one to twelve carbon atoms;

$R^3$ is alkyl or alkoxy-substituted alkyl, aryl or aralkyl group, and has from two to ten carbon atoms; and a is one to three, b is zero to two, and a+b is 1,2, or 3.

The $R^1$, $R^2$, and $R^3$ hydrocarbon groups may be cyclic, branched or linear.

The term water insoluble or slightly soluble silanes includes alkoxy silanes with solubilities between 0 and 8.0 weight percent in water at 25° C. Water insoluble alkoxy silanes with solubilities between 0 and 1 weight percent in water at 25° C. are preferred. Water soluble alkoxy silanes are not used because compositions made with such silanes are not stable for extended periods of time, i.e., more than two to three days at ambient conditions. Therefore, the R groups should be chosen to ensure low solubility of the silane in water.

$R^1$ may be an alkyl, aralkyl, alkaryl, or an aryl group, each further containing at least one organic-functional group substituent. Specific examples include substituted propyl, isopropyl, butyl, isobutyl, amyl, isoamyl, hexyl, heptyl, octyl, xylyl, benzyl, phenyl, cyclopentyl, cyclohexyl, phenylmethyl, phenylethyl, and the like. Specific examples of the substituent(s) on $R^1$ include mercapto, epoxy, methacryloxy, acryloxy, chloro, bromo, iodo, cyano, ketone, aldehyde, carboxylate, carboxylic acid, silyl ester (e.g.,— $SiR^2{}_b(OR^3)_{3-b}$ where $R^2$ and $R^3$ are as previously defined), amine, alkylamine, dialkylamine, arylamine, diarylamine, ureide, amide, isocyanurate, and alkoxy groups substituted with any of the foregoing. $R^1$ may also be a 3–30 carbon alkenyl group such as vinyl, allyl, oleyl, linoleyl, linolenyl, etc. With regard to epoxy substituents, cycloaliphatic epoxies are preferred over glycidyl epoxies for their superior shelf-life stability.

$R^2$ is exemplified by methyl, ethyl, n-propyl, n-butyl, n-hexyl, n-heptyl, n-octyl, n-nonyl, n-decyl, lauryl, cyclopentyl, cyclohexyl, cycloheptyl, cyclooctyl, isopropyl, isobutyl, sec-butyl, isoamyl, sec-amyl, 4-methyl-2-pentyl, 2-ethylhexyl and phenyl.

$R^3$ is exemplified by ethyl, n-propyl, n-butyl, n-hexyl, n-heptyl, n-octyl, n-nonyl, n-decyl, cyclopentyl, cyclohexyl, cycloheptyl, cyclooctyl, isopropyl, isobutyl, sec-butyl, isoamyl, sec-amyl, 4-methyl-2-pentyl, 2-ethylhexyl and phenyl.

Examples of the above-mentioned silane compounds include β-(3,4-epoxycyclohexyl)-ethyltriethoxysilane, β-(3,4-epoxycyclohexyl)-ethyltriisopropoxysilane, β-(3,4-epoxycyclohexyl)-ethyltriisobutoxysilane, 3-glycidoxypropyltriisobutoxysilane, 3-methacryloxypropyltriethoxysilane, 3-methacryloxypropyltriisopropoxysilane, 3-methacryloxypropyltriisobutoxysilane, vinyltriisopropoxysilane, vinyltriisobutoxysilane, 3-acryloxypropyltriethoxysilane, 3-mercaptopropyltriethoxysilane, vinylmethylbis-(isopropoxy)silane, 3-methacryloxypropylmethyldibutoxysilane, and bis or tris silanes such as 1,2 bis-(alkoxy) silyl ethanes and tris(3-triethoxysilylpropyl) isocyanurate.

The emulsifiers for use herein include nonionic, anionic or cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylene alkylphosphate ester. Examples of the cationic surfactants include quaternary ammonium salts such as long chain alkyl trimethylammonium salts, long chain alkyl benzyl dimethyl ammonium salts, and di(long chain alkyl)dimethyl ammonium salts. A further listing of surfactants useful in the present invention may be those described in 1994 McCutcheon's Vol. 1: *Emulsifiers and Detergents*, North American Edition (Manufacturing Confectioner Publishing Co., Glen Rock) 1994, which is incorporated herein by reference.

The appropriate HLB (hydrophobic-lipophilic balance) of the surfactants is chosen to correspond to the HLB of the specific alkoxy silane being emulsified. The method for selecting to optimum HLB for a substance is well known to one skilled the art and described in "The HLB System" by ICI Americas Inc., which is incorporated herein by reference.

The emulsifier(s) is suitably employed in the primer composition in an amount of 0/05 to 30 percent by weight of the primer, preferably 0.2 to 20 weight percent.

The amount of water present in the aqueous primer formulations is typically an amount raging from 30 to 99.75 weight percent of the total primer composition.

The silicon should be present in the range of 0.1 to 30 percent by weight of the primer, preferably 0.1 to 10 weight percent.

A second, non-adhesion promoting silane can be added to the primer emulsion to modify other properties of the primer. Such silanes include water insoluble or semi-soluble compounds having the formula:

where $R^4$ is an alkyl, aryl, aralkyl or alkaryl group having from three to thirty carbon atoms and $R^2$, $R^3$, and a and b are as previously defined. Examples of such silanes include methyltriisobutoxysilane, dimethyldipropoxysilane, ethyltriisopropoxysilane, diethyldipropoxysilane, propyltriisobutoxysilane, butyltributoxysilane, octyltriethoxysilane, amyltributoxysilane, amyltriethoxysilane, dodecyltriethoxysilane and phenyltriethoxysilane, and water insoluble or semi-soluble bis silyl alkanes such as dimethylbis-(isobutoxy)silane, dibutylbis-(isopropoxy)silane, and diphenyldipropoxysilane. This group of silanes tend to make the adhesion interface more hydrophobic making it more resistant to attack by water. A suitable amount for such second silanes is from about 0.1 to about 10%.

A silane condensation catalyst is usually not necessary in the primer compositions employed in the invention. However, depending on the activity of silane, such a catalyst which is hydrolytically stable may sometimes be beneficially employed in the primer formulation so long as said catalysts do not destabilize the composition to a point where the shelf-life is impractically short. Suitable catalysts which can be employed if desired include emulsified organotin, water soluble tertiary amine, imidazole and the like. Examples of such catalysts are organotitanate, organotin, chelated titanium, aluminum and zirconium compounds, and combinations thereof. Examples of chelated titanates are dihydroxy bis [2-hydroxypropanato (2-)-$O^1,O^2$)(2-)titanate, mixed titanium ortho ester complexes, TYZOR® 101, TYZOR GBA (acetylacetonate chelate), bis(ethyl-3-oxobutanolato $O^1,O^3$)bis(2-propanolato) titanium, TYZOR CLA, isopropoxy(triethanolaminato) titanium and alkanolamine complex of titanium, with TYZOR 131, LA, and 101 being preferred, all commercially available from E. I. DuPont de Nemours and Co., Wilmington, Del. Examples of organotin catalysts are FOMREZ® UL-1, UL-22, and UL-32 available from Witco Corp., Greenwich, Conn., and dibutyltin bis(1-thioglycerol). The catalyst can be used in an amount of 0.05–5 percent of the primer composition.

Wetting agent(s) and/or film former(s) (for instance, water dispersible or latex polymers) may also be utilized in the primer formulation in amounts effective to enhance even wetting of entire area of the substrate to which the primer is applied.

Additionally the primer can be modified with dispersed fillers such as carbon black, thixotropes, pigments, plasticizers, coalescing agents, biocides, fungicides, UV inhibitors, anti-oxidants and with resins which act as moisture barriers as needed. Such components may be employed in conventional amounts.

It is recommended that the aqueous primer be applied at a temperature above 0° C. It can be dried at high temperatures or at a room temperature before application of non-waterborne sealants and adhesives. For waterborne applications, the drying step may be eliminated. Latex sealants or adhesives may be directly applied onto the wet primer, and allowed them to cure at the same time.

The primer composition of the present invention additionally may contain crosslinking agents for the sealant, adhesive or coating system with which the primer is employed. Such crosslinking agents may include urea and melamine resins which are methylolated and/or alkoxylated, epoxy resins, aziridines and carbodiimides. Such agents may be present at 0.1 to 20 weight percent of the total composition, as long as they do not destabilize the composition during storage.

The pH of the primer composition may impact upon its hydrostability. High alkalinity or high acidity of the composition catalyzes the hydrolysis and condensation of the alkoxysilyl group of the silane. The closer the pH of the composition is to neutral, the better the stability of the emulsion. Therefore, the preferred range of pH is 5.5 to 8.5. Substances which can be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

The silane emulsion primers of the present invention may be prepared by first mixing the emulsifier with the alkoxy silane. Water is added and the mixture is stirred to provide a white, milky emulsion. The pH of the resulting emulsion is adjusted, if necessary, to pH 7.0±1.5.

The silane primers may be used with a variety of water-borne or solvent based polymeric adhesive, sealant or coating systems. Examples include acrylic or polyurethane latexes, high solid polyurethanes, epoxies and silicones. When used with waterborne systems, it is not necessary to wait for the primer to dry before application of the sealant, adhesive or coating. The primers can also be usefully employed with curable 100% solids formulations such as RTV silicones, (meth)acrylate ester monomer, and reactive PUR hot melt formulations.

For use with a specific type of sealant, adhesive or coating resin system, the group $R^1$ is suitably one which will promote bonding by one or more of coupling reactions, hydrogen bonding, polar-group attraction, and the like, with the resin system or a component thereof.

In use, the primer is applied, optionally dried, and then the polymer sealant, adhesive or coating composition is applied in conventional manner and allowed to cure or set. If the polymer composition is aqueous based, it may be advantageous to apply the polymer composition before the primer has fully dried, as the undried or partially dried primer will typically be compatible with such systems and in some instances has been observed to give improved adhesion.

The polymer composition is cured at its customary temperature, which will typically be ambient temperature or an elevated temperature of up to about 200° C. Such curing may be accomplished by standard means in the art.

It is possible to use the primer compositions for various purposes, e.g., with paints, adhesives, coating materials, caulks and sealants.

The invention is illustrated by the following non-limiting examples.

EXAMPLES

Sealants Used in the Evaluation:

All sealants used in this evaluation are commercial products. Their branch names and manufacturers are:

TABLE I

Commercial Sealants Used for the Evaluation

| Brand Name | Sealant Category | Manufacturer |
| --- | --- | --- |
| Alex Paint | Acrylic Latex | Dap Inc. |
| Alex Plus | Acrylic Latex | Dap Inc. |
| Formula "230" | Acrylic Latex | Dap Inc. |
| Dymonic | 1K polyurethane | Tremco Inc. |
| Dow 795 | RTV Silicone | Dow Corning |

Adhesion-in-Peel Test:

All test substrates, except concrete substrates, were thoroughly cleaned by isopropanol, detergent (0.1% solution) and rinsed by deionized water. The cleaned substrates were allowed to air dry prior use. Concrete substrates were immersed in a concentrated alkaline solution for at least 24 hours and washed by deionized water thoroughly. The air dried concrete substrates were stored in a desiccator before use.

The adhesion-in-peel testing was conducted in accordance with ASTM C 794. The preparation of the test specimens consisted of embedding a strip of 30 mesh aluminum screen in a thin layer of a sealant on substrates, immersing cured specimens in deionized water for 7 days, and 180° peel testing by an Instron.

The aqueous primers were tested against AP-134, a solvent based silane primer manufactured by Witco Corp.

EXAMPLE 1

A silane emulsion was prepared from the ingredients listed in Table II using the procedure described below.

Into a Nalgene beaker was placed a mixture of commercial surfactants composed of 1.54 grams of S-Maz 60 and 1.46 grams of Tween 40. The mixture was heated slightly with a warm water bath to melt the solid surfactants. β-(3,4-epoxycyclohexyl)-ethytriethoxysilane (40 grams) was added and the mixture was stirred with a mechanical stirrer for several minutes until homogeneous. 0.4 Grams of Germabem II was added as a biocide. The mixing speed was increased to 2400 rpm and 56.6 grams of water were added. A white emulsion resulted after stirred for five minutes. The emulsion was transferred to a Oster blender and blended for an additional 5 minutes at a high rpm to reduce the particle size. The average particle size of the resulting silane emulsion was 0.8 microns.

TABLE II

Formulation of the Silane Emulsion

| Ingredient | Source | Weight |
| --- | --- | --- |
| β-(3,4-epoxycyclohexyl)-ethytriethoxysilane | Witco Corp. | 40 |
| S-Maz 60 | PPG | 1.54 |
| Tween 40 | ICI | 1.46 |
| Distilled Water |  | 56.6 |
| Germabem II | Sutton Labs | 0.4 |

EXAMPLE 2

Aqueous Primer 1:

Into a beaker with 75 grams of distilled water was added 25 grams of the emulsified epoxysilane prepared in Example 1. The mixture was blended by a magnetic stirrer for about a hour to obtain a homogeneous emulsion, which contains 10% by weight of the epoxysilane.

EXAMPLE 3

Aqueous Primer 2:

The procedure of Example 2 was repeated except that 0.5% by weight of Imicure® EMI-24, a catalyst from Air Products, was also added to the primer mixture.

EXAMPLE 4

Adhesion to Different Substrates

A thin layer of the Aqueous Primer 2 from Example 3 was applied to different substrates and allowed to dry at room temperature overnight. The peel test specimens were prepared with Alex Plus acrylic sealant and Dymeric polyurethane sealant respectively. The specimens were cured at 23° C. and 50% relative humidity for three weeks. The adhesion-in-peel test conducted right after the water treatment. The test results are listed in the Table III.

TABLE III

| | (lbs/in/Failure) | | | | | |
|---|---|---|---|---|---|---|
| | Sealant | | | | | |
| | Alex Plus | | | Dymonic | | |
| | Primer | | | | | |
| Substrate | None | Primer 2 | AP-134 | None | Primer 2 | AP-134 |
| Glass | 0 | 4.5/CF | 2.8/80% CF | 8.2/CF | 11/CF | 10.7/CF |
| Aluminum | 4/90% AF | 6.5/CF | 2.7/70% AF | 10.6/CF | 8.9/CF | 10.2/CF |
| Concrete | 0 | 6/60% CF | 3.7/CF | 8.6/50% AF | 8/CF | 9.2/80% CF |
| Oak plywood | 1.2/AF | 5.8/CF | 2.8/80% CF | 6.9/CF | 8.4/CF | 8.8/CF |
| Polystyrene | 0 | 6.5/CF | 0.5/AF | 1/AF | 8.6/80% CF | 2.5/AF |
| ABS | 0.2/AF | 4.5/CF | 0.3/90% AF | 10.3/CF | 7.5/CF | 11.2/CF |
| PVC | 0 | 5.5/CF | 1.6/90% AF | 10/CF | 9.6/CF | 11.2/CF |

CF -- Cohesive failure,
AF -- Adhesive failure.

EXAMPLE 5
Comparison of Wet or Dried Primer Layers:

Both Primer 1 and Primer 2, from Examples 2 and 3 respectively, were tested in this experiment versus AP-134. Formula '230', an acrylic latex sealant, was used to prepare the test samples. The primers were evenly sprayed onto glass substrates respectively. The sealant was then applied on both a wet primer layer immediately after spray and a dried primer layer after 12 hour drying at room temperature. The samples were cured at 23° C. and 50% relative humidity. The adhesions are compared in the Table IV.

TABLE IV

| | (lbs/in/Failure) | |
|---|---|---|
| Primer | Wet Primer | Dried Primer |
| None | | 8.5/AF |
| Primer 1 | 8.7/CF | 6.9/CF |
| Primer 2 | 9.5/CF | 5.6/CF |
| AP-134 | 7.4/CF | 4.9/CF |

EXAMPLE 6
Compatibility of the Aqueous Primer with Different Sealants:

Sealants used in this test were selected from commercial products of acrylic latex, 1K polyurethane and RTV silicone. The Primer 1 and A-134 were applied to concrete substrates and allowed to dry at 120° C. for 20 minutes before applying the sealants. Compatibility of the primers to sealants are demonstrated in the Table V.

TABLE V

| | (lbs/in/Failure) | | | |
|---|---|---|---|---|
| Primer | Alex Plus | Alex Paint | Dymonic | Dow 795 |
| None | 0 | 0 | 0 | 0 |
| Primer 1 | 5.4/CF | 3.8/80% CF | 11.5/CF | 6.8/50% CF |
| AP-134 | 4.4/90% CF | 5.1/90% CF | 6.6/AF | 12.3/CF |

The foregoing examples demonstrate that these aqueous primers are compatible with the most common types of sealants (Table V). When used with polyurethane sealants, the performance of aqueous primer is comparable to the solvent based AP-134. When applied with acrylic latex sealants, the performance of waterborne primers exceeds the solvent borne primer (see Table III).

Table IV illustrates the adhesion improvement by these new primers. Cohesive failure observed with all primed sealants compared to adhesive failures for non-primed sealants. It was surprising that the primers used while still wet gave higher peel strengths than those of the dried primers. Thus it is preferred to apply sealants and adhesives on a fresh wet aqueous primer layer, especially when waterborne sealants are in use. By doing this, the working time is reduced.

The comparison of Primer 1 and Primer 2 in Table IV shows that for the epoxysilane used in this study, the effect of additional catalyst on adhesion is minor and the effect of drying temperatures on adhesion is also minor.

We claim:

1. A process comprising applying an adhesion promoting primer composition to a substrate surface, subsequently applying a curable sealant, adhesive or coating formulation to the primed substrate, and allowing said sealant, adhesive or coating formulation to cure, wherein the primer is an aqueous emulsion of at least one adhesion-promoting organosilane of the formula:

$$R^1_a R^2_b Si(OR^3)_{4-a-b}$$

where
  $R^1$ is a hydrocarbon group having from three to thirty carbon atoms which is substituted with an organic functional group;
  $R^2$ is alkyl, alkoxy-substituted alkyl, aryl or aralkyl, and has from one to twelve carbon atoms;
  $R^3$ is alkyl or alkoxy-substituted alkyl, aryl or aralkyl group, and has from two to ten carbon atoms; and
  a is one to three, b is zero to two, and a+b is 1,2, or 3 which silane is soluble at between 0 and 8.0 weight percent in water at 25° C.

2. A process as in claim 1 wherein the primer comprises water in an amount of from 30 to 99.75 weight percent of the total primer composition.

3. A process as in claim 1 wherein $R^1$ is an alkyl, aralkyl, alkaryl, or an aryl group, further containing at least one organic-functional group substituent.

4. A process as in claim 3 wherein the organic-functional group substituent on $R^1$ is a mercapto, epoxy, methacryloxy, acryloxy, chloro, bromo, iodo, cyano, ketone, aldehyde, carboxylate, carboxylic acid, silyl ester, amine, alkylamine, dialkylamine, arylamine, diarylamine, ureide, amide, or isocyanurate group or is an alkoxy group substituted with at least one of said groups.

5. A process as in claim 1 wherein $R^1$ is a 2–30 carbon alkenyl group.

6. A process as in claim 1 wherein $R^1$ is vinyl, allyl, oleyl, linoleyl or linolenyl.

7. A process as in claim 1 wherein $R^1$ comprises a cycloaliphatic epoxy.

8. A process as in claim 1 wherein $R^2$ is methyl, ethyl, n-propyl, n-butyl, n-hexyl, n-heptyl, n-octyl, n-nonyl, n-decyl, lauryl, cyclopentyl, cyclohexyl, cycloheptyl, cyclooctyl, isopropyl, isobutyl, sec-butyl, isoamyl, sec-amyl, 4-methyl-2-pentyl, 2-ethylhexyl or phenyl.

9. A process as in claim 1 wherein $R^3$ is ethyl, n-propyl, n-butyl, n-hexyl, n-heptyl, n-octyl, n-nonyl, n-decyl, cyclopentyl, cyclohexyl, cycloheptyl, cyclooctyl, isopropyl, isobutyl, sec-butyl, isoamyl, sec-amyl, 4-methyl-2-pentyl, 2-ethylhexyl or phenyl.

10. A process as in claim 1 wherein said silane is selected from the group consisting of β-(3,4-epoxycyclohexyl)-ethyltriethoxysilane, β-(3,4-epoxycyclohexyl)-ethyltriisopropoxysilane, β-(3,4-epoxycyclohexyl)-ethyltriisobutoxysilane, 3-glycidoxypropyltriisobutoxysilane, 3-methacryloxypropyltriethoxysilane, 3-methacryloxypropyltriisopropoxysilane, 3-methacryloxypropyltriisobutoxysilane, vinyltriisopropoxysilane, vinyltriisobutoxysilane, 3-acryloxypropyltriethoxysilane, 3-mercaptopropyltriethoxysilane, vinylmethylbis-(isoproxy)silane, 3-methacryloxypropylmethyldibutoxysilane, 1,2 bis-(alkoxy) silyl ethanes and tris(3-triethoxysilylpropyl) isocyanurate.

11. A process as in claim 1 wherein said primer composition further comprises a surfactant.

12. A process as in claim 1 wherein said silane has a solubility of between 0 and 1 weight percent in water at 25° C.

13. A process as in claim 1 wherein the primer further comprises a second, non-adhesion promoting, silane having the formula:

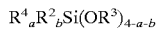

where $R^4$ is an alkyl, aryl, aralkyl or alkaryl group having from three to thirty carbon atoms and $R^2$, $R^3$, and a and b are as previously defined.

14. A process as in claim 1 wherein the primer further comprises a second, non-adhesion promoting, silane which is a member selected from the group consisting of methyltriisobutoxysilane, dimethyldipropoxysilane, ethyltriisopropoxysilane, diethyldipropoxysilane, propyltriisobutoxysilane, butyltributoxysilane, octyltriethoxysilane, amyltributoxysilane, amyltriethoxysilane, dodecyltriethoxysilane phenyltriethoxysilane, dimethylbis-(isobutoxy)silane, dibutylbis-(isopropoxy)silane, and diphenyldipropoxysilane.

15. A process as in claim 1 wherein the primer further comprises a silane condensation catalyst.

16. A process as in claim 1 wherein the primer composition has a pH of 5.5 to 8.5.

17. A process as in claim 1 wherein the primer further comprises one or more of a wetting agent, a film former, a filler, a thixotrope, a pigment, a plasticizer, a coalescing agent, a biocide, a fungicide, a UV inhibitor, an anti-oxidant, and a moisture barrier resin.

18. A process as in claim 1 wherein said sealant, adhesive or coating formulation is selected from the group consisting of acrylic and polyurethane latexes, high solids polyurethanes, epoxies, RTV silicones, (meth)acrylate ester monomer formulations, and reactive PUR hot melt formulations.

19. A process as in claim 1 wherein the primer is allowed to at least partially dry between said step of applying the adhesion promoting primer composition to the substrate surface and the step of applying the curable sealant, adhesive or coating formulation.

20. A process as in claim 1 wherein said wherein said sealant, adhesive or coating formulation is an aqueous formulation.

21. A process as in claim 20 wherein the step of applying the curable sealant, adhesive or coating formulation occurs while the primer composition is wet.

22. A process as in claim 1 wherein the substrate is selected from the group consisting of glass, metal, concrete and plastics.

23. A process as in claim 1 wherein said silane comprises from 0.1 to 30% by weight of the primer composition.

* * * * *